United States Patent
Nussinovitch et al.

[11] Patent Number: 6,068,867
[45] Date of Patent: May 30, 2000

[54] PROTECTIVE COATINGS FOR FOOD AND AGRICULTURAL PRODUCTS

[75] Inventors: Amos Nussinovitch, Petach Tikva; Varda Hershko, Rohovot; Haim D. Rabinovitch, Kyriat Onu, all of Israel

[73] Assignee: Yissum Research Development Company of the Hebrew University of Jerusalem, Jerusalem, Israel

[21] Appl. No.: 08/836,602
[22] PCT Filed: Nov. 2, 1995
[86] PCT No.: PCT/US95/14252
  § 371 Date: Jul. 14, 1997
  § 102(e) Date: Jul. 14, 1997
[87] PCT Pub. No.: WO96/13984
  PCT Pub. Date: May 17, 1996

[30] Foreign Application Priority Data

Nov. 2, 1994 [IL] Israel ......................................... 111495

[51] Int. Cl.⁷ ............................... A23L 1/05; A23L 1/0532
[52] U.S. Cl. ......................... 426/102; 426/303; 426/304; 426/310; 426/573; 426/575; 426/615; 426/616; 426/654
[58] Field of Search ..................................... 426/102, 573, 426/575, 303, 304, 310, 615, 616, 654

[56] References Cited

U.S. PATENT DOCUMENTS

| | | |
|---|---|---|
| 5,128,159 | 7/1992 | Sayles . |
| 5,156,866 | 10/1992 | Sato et al. . |
| 5,198,254 | 3/1993 | Nisperos-Carriedo et al. ........ 426/102 |
| 5,376,391 | 12/1994 | Nisperos-Carriedo et al. . |

*Primary Examiner*—Helen Pratt
*Attorney, Agent, or Firm*—Browdy and Neimark

[57] ABSTRACT

A protective coating for food or agricultural products made of 5–85% dried hydrocolloid gel, together with 0.2–50% of at least one natural compound isolated from the surface of the product, or at least one compound substantially similar thereto, for example, sitosterol, stigmasterol or milk.

2 Claims, 4 Drawing Sheets

PROTECTIVE COATINGS FOR FOOD AND AGRICULTURAL PRODUCTS

FIELD OF THE INVENTION

The invention relates generally to the preservation of food and agricultural products. More particularly, the invention relates to a hydrocolloid protective coating which provides improved protection of the product and thereby extending its shelf-life.

The invention also relates to other aspects e.g. to a method for producing the coating and to food and agricultural products protected by the coating.

BACKGROUND OF THE INVENTION

The need to prolong shelf-life of food products, in particularly fresh produce, without harming quality, is well recognized. Many coating formulations are disclosed in the literature.

One of the known methods for coating fresh produce such as onions and edible fungi is to form a coating by applying to the exterior surface of an onion or fungi a gelation solution comprising a hydrocolloid, such as sodium alginate and cross linking the hydrocolloid on the surface by a solution comprising a gelation inducing agent, such as $CaCl_2$.

The so obtained coating is both biodegradable and edible and provides a protective coating to the treated vegetable. U.S. Pat. No. 3,865,962 discloses a process for coating raw onion products by immersion of the onion in an aqueous dispersion containing water soluble algin and subsequently treating the coated onion with an aqueous calcium ion to induce gelation.

EP 277 448 discloses an edible coating containing gelatin and polysaccharide. A cross-linking agent containing calcium ions is used for obtaining the coating.

However, none of the prior arts disclose a coating containing in its matrix a compound having a specific reference to the surface of the product to be coated.

SUMMARY OF THE INVENTION

It is an object of the present invention to provide an improved coating for food and agricultural products.

A more specific object is to provide a coating tailored to the specific food or agricultural product.

Another object of the invention is to control the hydrophobicity of the coating and its chemical compatability to the skin surface, thereby improving adhesiveness to the product and thus resulting in better control of the modulated atmosphere surrounding the coated product.

The invention provides a protective coating for food or agricultural product comprising 5–85% dried hydrocolloid gel, together with 0.2–50% of at least one natural compound isolated from the surface layers of said product, or at least one protective compound substantially similar thereto.

The invention also provides a method for producing a protective coating for food and/or agricultural product comprising applying to the external surface of said product a gelation solution comprising a hydrocolloid and, optionally, a solution comprise a gelation inducing agent, wherein at least one of said solutions further comprises at least one natural compound isolated from the surface layers of said product, or at least one compound substantially similar thereto.

Application of a gelation inducing agent is essential to the invention when the hydrocolloid undergoes gelation only in the presence of a gelation inducing agent. However, with hydrocolloids such as agar or gelatin, which undergo gelation without a gelation inducing agent, the application of a solution containing said agent is not required.

The gelation inducing agent can be applied first and the hydrocolloid solution thereafter, or alternatively, the hydrocolloid solution is applied first and the gelation inducing agent is applied subsequently thereafter.

It was found that the addition of an agent which reduces the surface tension of the coating causes a better compatability between the coating and the surface free energy of the coated food. Example of such an agent is ethanol, which may be added to the gelation inducing agent or the food product may be immersed in such agent prior to producing the coating.

The natural compound isolated from the surface layers of the product, or the protective compound substantially similar thereto, can be incorporated into the gelation solution comprising the hydrocolloid, or into the gelation inducing agent solution.

The gelation inducing agent may be a cross linking agent, a poly anion, a poly cation, or a mixture thereof. Preferably the gelation inducing agents are chloride salts such as calcium chloride for alginates, potassium chloride for K-carrageenan and magnesium chloride for gellan. Examples of other suitable gelation inducing agents are calcium lactate, calcium stearate, calcium acetate, calcium gluconate and polyphosphates.

The hydrocolloid in the gelation solution may be any known hydrocolloid which may undergo gelation such as agar, agarose, alginate, gelatin, low methoxy pectin (LMP), chitosan, gellan, K-carrageenan or mixtures of xanthan together with locust bean gum (LBG).

The natural compound isolated from the surface layer of the food or agricultural product, which provides the specific tailoring of the coating to the product, may be a hydrocarbon, wax, sterol, protein, fat, squalene (isolated from tomato), or a mixture thereof. Alternatively, the natural compound isolated from the surface of the food or agricultural product to be coated may be substituted by a natural product isolated from a different source, subject to being very similar in most physical and chemical properties to a compound present on the surface to be coated so as to be capable of providing a similar protective function. Yet another alternative is to utilize a synthetic protective compound substantially similar to a natural compound present in the surface layer to be coated.

The coating obtained is a dry film consisting of a matrix of dried hydrocolloid gel with a compound specific to the product to be coated incorporated within said matrix.

The gelation solution may further comprise a known adhesive agent such as natural gums, e.g. locust bean gum and gum arabic, polyoxes, cationic water soluble polymers, gelatin, wellan gum, xanthan, guar gum, karya gum or fenugreek.

The gelation solution may further comprise emulsifying agents such as lecithin, ethylene glycol monostearate, ammonium louryl sulfate, sodium steroyl-2-lactylate, potassium oleate, propylene glycol monostearate, sodium alkyl sulfate, oleic acid or polyglycols.

The gelation solution may further comprise a preservative agent, such as potassium sorbate, bisulfite, or sodium benzoate.

According to the invention the coating can be applied to any food or agricultural product which requires extension of shelf-life such as fruits, vegetables, cuttings, bulbs, tubers, corms of flowers and ornamentals, fungi, or processed food products, preferably food products containing fatty ingredients, such as cheeses, ice cream cones, or baked goods.

The invention extends to food and agricultural products coated in accordance with the invention.

Preferably, the hydrocolloid solution comprises between 0.2% to 20% of hydrocoloid and the contents of the natural product (e.g. sterol), or the compound substantially identical thereto ranges between 0.001% to 5%. The higher the sterol concentration the better coating is achieved; however, due to the high costs of sterols or other waxy materials suitable for the coating according the the invention, it is preferable to decrease the content of the sterol in the gelation solution and thereby in the coating, so that an optimal coating at reasonable costs is obtained.

The invention is illustrated in more detail by the following non limiting description and specific examples with reference to the drawings.

DETAILED DESCRIPTION OF THE INVENTION

EXAMPLE 1

Coating of fresh garlic heads (bulbs) was performed by immersion of the bulbs in a 2% sodium alginate solution, containing 0.2% (w/w) β-sitosterol, previously dissolved in absolute ethanol. β-sitosterol was purchased from SIGMA. Bulbs were immersed in the solution for 5 to 60 sec; thereafter, excess of the alginate-sterol solution was allowed to drip for about 1 min and the garlic bulbs were then immersed in 2% (w/w) calcium chloride solution for 5 to 60 sec. The wet film was dried either at room temperature, or under a continuous flux of warm air (60° C.) for 5 minutes. After drying bulbs were stored under 25° C. and 70% relative humidity for further evaluation. For comparative purposes, garlic heads ware treated by the same procedure with a 2% sodium alginate solution devoid of any sterol and subsequently in a 2% $CaCl_2$ solution to produce a known coating. Control bulbs were left untreated.

The dry film of the coated garlic contains 81% crosslinked sodium alginate, 9% sterol and 10% water.

Figure 1:
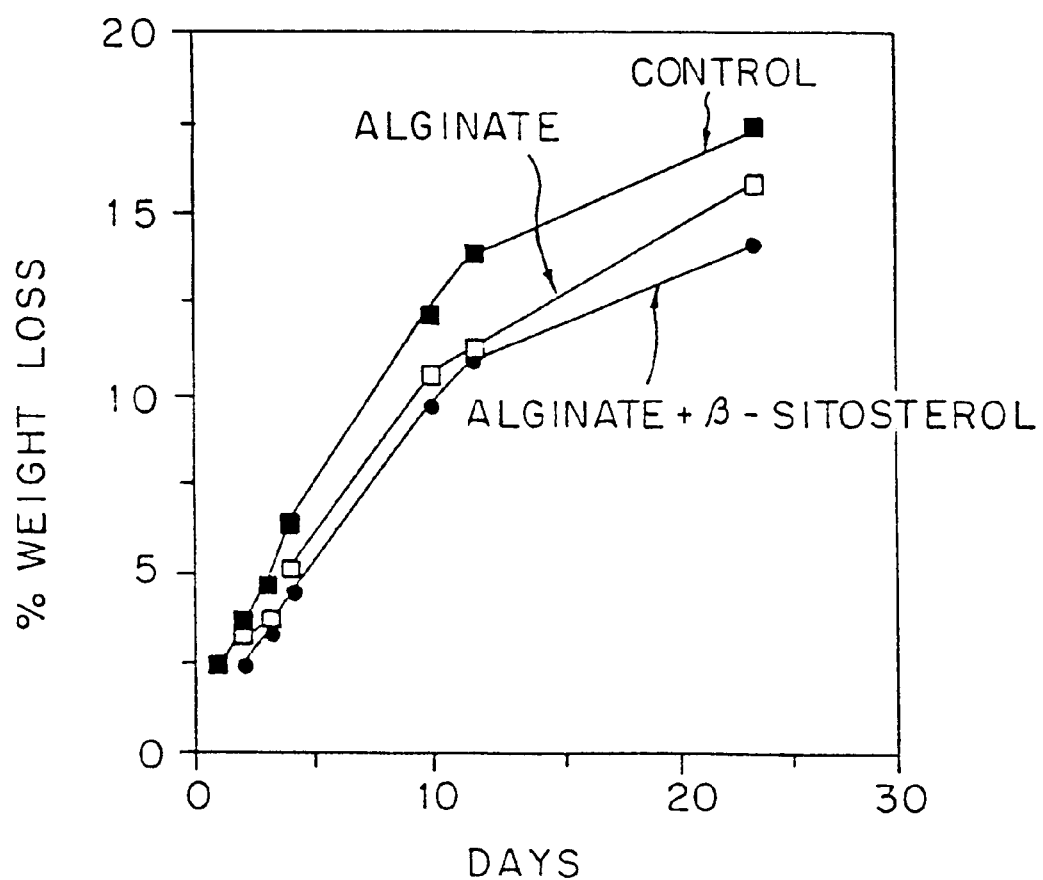
FIG. 1 is a graph depicting the weight loss of garlic bulbs as a function of time. Garlic bulbs coated by an alginate together with β-sitosterol according to one embodiment of the invention (●) as compared with alginate coating (⊡) and with no coating—(□).

The fresh weight loss of the treated garlic bulbs was measured as a function of time and depicted in FIG. 1, which shows that after 3 weeks in storage weight loss in control bulbs was 17.3%, weight loss of alginate treated bulbs was by 1.5% less than controls, whereas weight loss of bulbs having a coating of alginate in combination with β-sitosterol was 3.3% lower than control. It should be noted that a decrease of 3.3% in weight loss means a saving of 33 kg per one ton of garlic bulbs, which is of high commercial significance.

Water vapor permeability of coating was measured using standard test methods for vapor transmission of materials as described in ASTM E-96-93 (1993). Water vapor transmission (WVT) was found to be 540 g/d $m^2$ for alginate coating whereas alginate with 0.2% β-sitosterol decreased the WVT to 450 g/d $m^2$. Accumulation of carbon-dioxide under the coating was determined by injection of inherent gases, sampled by an appropriate syringe, into Gas Chromatograph (Gow-Mac series 850), equipped with poropack column Q. Accumulation of carbon dioxide is known to improve the shelf life of the vegetable by reducting respiration and acting as ethylene antagonist, thus postponing deterioration of the fresh vegetable. Alginate coated garlic contained 0.315% carbon dioxide, after 33 days of storage at 25° C. and 70% R.H. Garlic bulbs coated with alginate together with β-sitosterol contained 0.834% carbon dioxide after storage for the same period and under same conditions. Uncoated garlic contained only 0.15% carbon dioxide.

The force required for peeling the coatings produced was measured. Peeling test was performed with a custom made peeling unit attached to Instron 1100 Universal Testing Machine. The peeling device being similar to that described in ASTM D413-82 (2) and SAE J 1600-87. The rate of peeling was 5 mm/min and the peeled area 1 square centimeter. Peeling of an alginate coating required 11 mN whereas for a coating of an alginate and 0.2% β-sitosterol a force of 13 mN was measured. The higher peeling force indicates better attachment of the coating to the garlic skin; hence the coating containing sterol is more strongly attached and thus more difficultly detached from the natural skin of the garlic, thereby ensuring adhesion.

EXAMPLE 2

Figure 2:
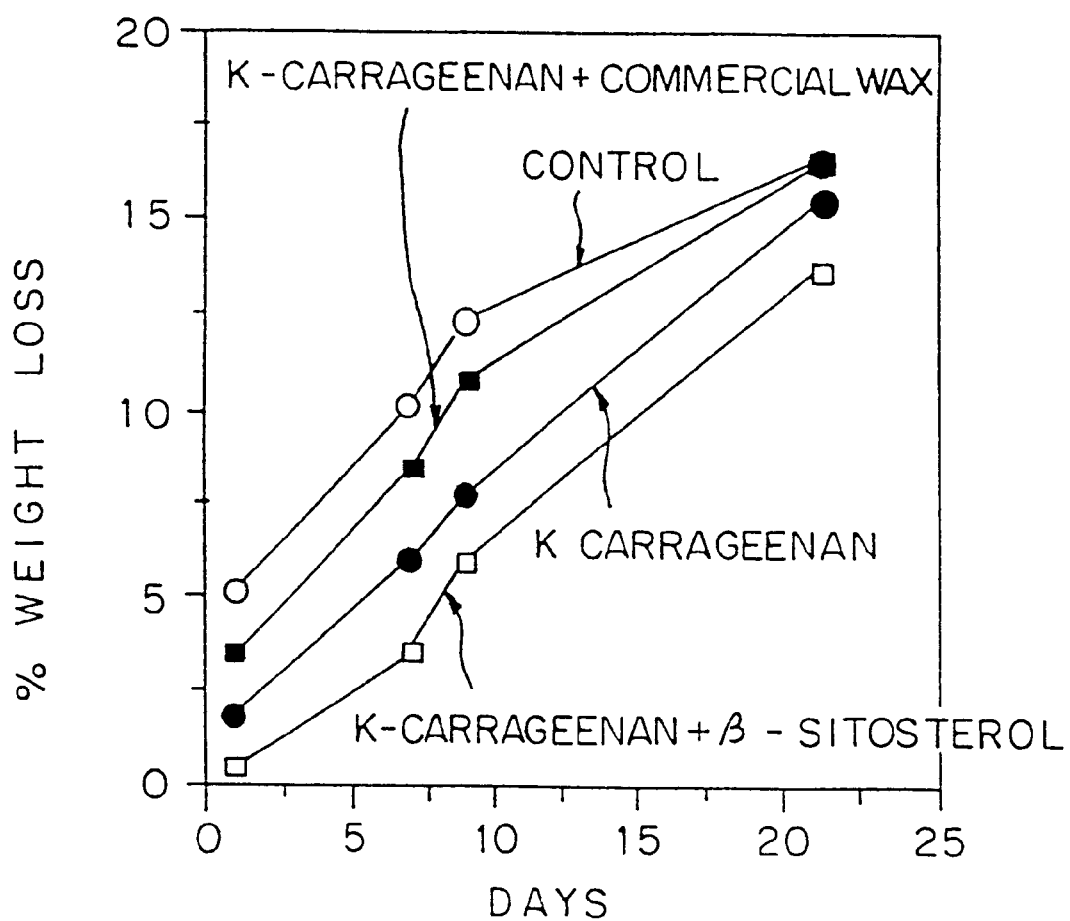
FIG. 2 is a graph depicting the weight loss of garlic bulbs as a function of time in another embodiment of the invention—garlic bulbs coated by a K-Carrageenan with β-sitosterol (⊡). Comparison to coating with K-Carrageenan without a further additive (●), to K-Carrageenan together with commercial wax (□) and to no coating (0) is also depicted.

Great headed garlic bulbs were immersed in a warm solution (50°–60° C.) containing 2% K-carrageenan and 0.2% β-sitosterol for about 5 seconds. Excess of the carrageenan-sterol solution was allowed to drip and the great headed garlic bulbs were then immersed in 2% (w/w) potassium chloride solution. The wet film was dried either at room temperature, or under a continuous flux of warm air and the dried bulbs were stored as described in example 1. For comparative purposes, similar bulbs of great headed garlic were treated by the same procedure using a 2% K-carrageenan solution devoid of any sterol, and by a 2% K-carrageenan solution containing commercial wax, such as wax used for waxing avocado and citrus fruit. Control bulbs were left untreated. The fresh weight loss of the great headed garlic bulbs was measured as a function of time and is depicted in FIG. 2, which shows that weight loss of K-carrageenan treated bulbs was by 1.8% less than uncoated controls whereas weight loss of bulbs having a coating of K-carrageenan in combination with β-sitosterol was 3.6% less than control. K-carrageenan coating with commercial wax was less effective in respect of weight loss, as compared to above mentioned coatings. Commercially, the coating of K-carrageenan in combination with β-sitosterol results in reduced losses of 36 kg per one ton of great headed garlic.

The contents of the dry film is 73% cross-linked K-carrageenan, 7% sterol and 20% water.

Water vapor permeability was measured as described in example 1. It was found that water vapor transmission WVT for the K carrageenan coating was 453 g/d m$^2$ whereas for the K-carrageenan together with β-sitosterol the WVT decreased to 394 g/d m$^2$.

Accumulation of carbon-dioxide was measured as described in Example 1, was found to be 0.23% for the K-carrageenan coating and 0.4% for the K-carrageenan in combination with β-sitosterol.

Figure 3A:
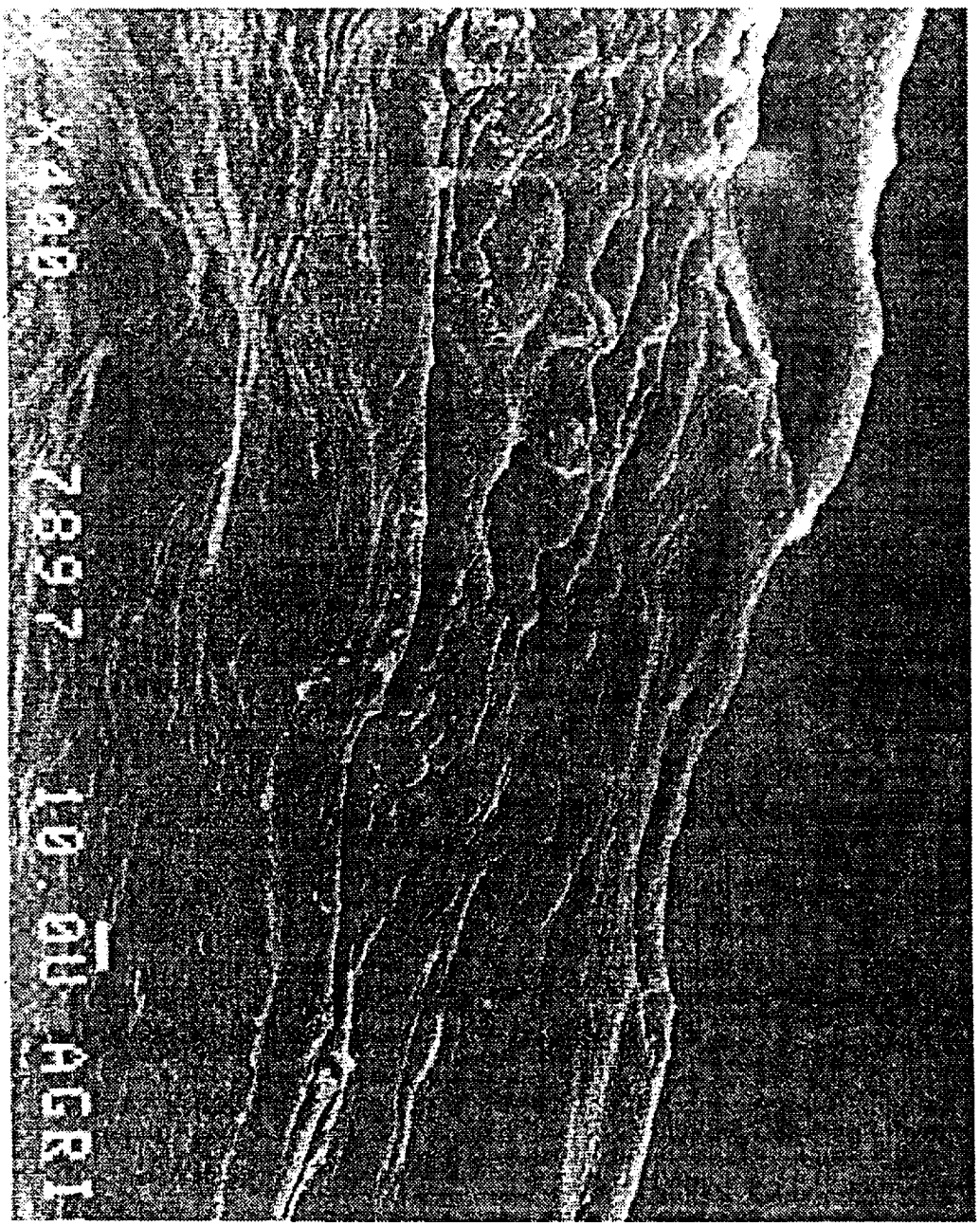
FIG. 3(a) is an electron microscope micrograph of: a skin of garlic bulb coated by a solution containing 2% K-Carrageenan.
Figure 3B:
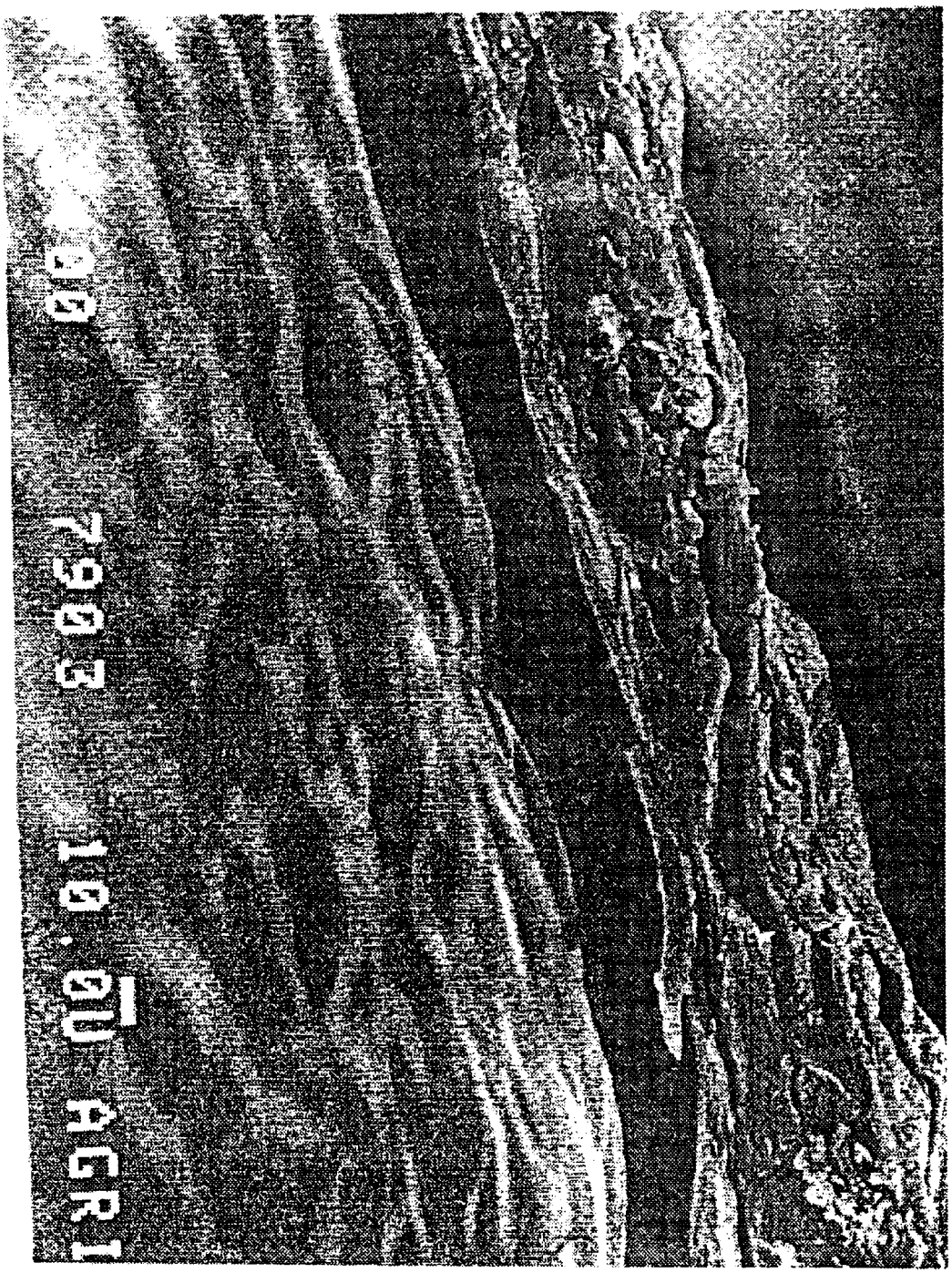
FIG. 3(b) is an eletron microscope micrograph of: a skin of garlic bulb coated by a solution containing 2% K-Carrageenan together with 0.2% β-sitosterol.

Electron microscope micrographs provide further information on the adhesion of the coating to the natural skin of the great headed garlic. Mean distances between the K-carrageenan coating and the great headed garlic skin were found to be 15 microns, whereas the distance between the hydrocolloid-sterol coating and the skin of the great headed garlic was only 7.8 microns. The electron microscope micrographs of FIG. 3 show clearly the differences in distance.

Analysis of the natural waxes found on the exterior of the great headed garlic, prior to coating, showed its dominant component to be β-sitosterol.

EXAMPLE 3

Dry garlic bulbs (three months after harvest) were immersed in a warm solution (60–70° C.), containing 2% gellan gum (Kelcogel) and 0.01% β-stigmasterol for about 15 seconds. Excess of the gellan-sterol solution was allowed to drip and the garlic bulbs were then immersed in 0.2% (w/w) MgCl$_2$ solution. The gelled layer coating of the garlic was then dried by blowing warm air, and the dried bulbs were then stored as described in example 1. For comparative purposes similar dry garlic bulbs were treated in same procedure with 2% gellan solutions. After 40 days of storage in ambient temperature, bulbs coated with gellan lost about 4.2% of their initial weight and those with gellan and sterol lost about 3.5% moisture. Thus, about 17% difference in moisture loss was presented by the coating.

Good mechanical properties of dry films can be achieved by using gellan gum together with sterol. The strength (stress at failure) of this coating was about 20.9 MPa and the strain at failure was 0.046 in average.

The dry film of the gellan-sterol coating contains 91.5% cross-linked gellan, 0.5% sterol and 8% water.

EXAMPLE 4

Garlic bulbs were immersed in 0.5% (w/w) MgCl$_2$ for about 60 sec to ensure good wetting. The excess of the crosslinking agent was allowed to drip and then the garlic bulbs were immersed in a 1.5% (w/w) gellan solution containing 0.005% β-sitoterol and 0.0025% stigmasterol, both latter compounds of which were previously dissolved in absolute ethanol. Weight difference of 25% in favor of the coated bulbs were found when compared to bulbs coated by the same solutions applied at a different order.

The dry film of the gellan-sterol coating contains 87.5% cross-linked gellan, 0.5% sterols and 12% water.

EXAMPLE 5

Flower bulbs of the narcissus family were immersed in a warm solution (45° C.) of 0.5% agarose containing 0.01% β-stigmasterol and 0.001% of potassium sorbate at a pH of about 4.2, for about 20 seconds. Excess of the agarose-sterol solution was allowed to drip and the flower bulbs were kept at room temperature until gelation of the agarose on the surface of the bulb was completed. Later it was dried in hot air tunnel for about 5 min until the dried hydrocolloid coating contained about 5% moisture.

The bulbs were then stored for 5 months in an open shed. At the end of the storage period, it was found that the coating reduced the percent of infections caused by Aspergillus, Botrytis and Fusarium spp. on the surface of the bulbs by about 25% of control and that the weight loss was reduced by about 15%, compared to uncoated flower bulbs, for a storage of about 5 months. These results were achieved because of the high heat capacity of the agarose solution, the good adhesion and the effectiveness of the potassium sorbate at the storage conditions.

The dry film contains 93% agarose, 1.8% sterol, 0.2% potassium sorbate and 5% water.

The reduction in weight loss improved the size and appearance of the flower produced from the coated bulbs, as compared with uncoated bulbs.

EXAMPLE 6

Dry garlic bulbs (coated about 3 months after harvest) were immersed in a warm solution (60–70° C.), containing 2% cellan gum (Kelcogel), 0.01% β-stigmasterol, 0.5% lecithin and 0.5% Locust Bean Gum for about 15 seconds. Excess of the gellan-sterol-lecithin-adhesive agent solution was allowed to drip and the garlic bulbs were then immersed in 0.2% (w/w) MgCl$_2$ solution. The gelled layer coating the garlic was then dried by a blow of warm air. The dried bulbs were then stored at ambient temperatures for 40 days. For comparative purposes, similar dry garlic bulbs were treated in same procedure with a 2% gellen gum solution devoid of sterol, lecithin and Locust Bean Gum. The dry film contains 47.8% hydrocollolid, 11.9% lecitin, 11.9% Locust Bean Gum, 0.4% stigmasterol and 28% water.

The gellan-sterol emulsifier-adhesive coating was found to reduce the weight loss of garlic, as compared to gellan coating, by about 20%. For the gellan coating, about 4.2% moisture loss was measured, after 40 days of storage, whereas 3.36% water loss was measured for the bulbs coated with the gellan-sterol-lecithin-LBG combination.

EXAMPLE 7

Hard yellow cheese with pH of 5.2, 57% dry matter, 30% fat, 1.6% salt was immersed first in 2% calcium lactate solution and then in 1.5% sodium alginate solution which was previously dissolved in milk. Similar experiments were performed for K-carrageenan with the addition of 1% KCl on the basis of full milk (3% fat).

After immersion for 60 sec. in the calcium lactate solution, the cheese was immersed in the alginate for about 30 sec and then the excess of the solution was allowed to drip for one minute. Drying was done by blowing air at 30° C. for 2 minutes and then 20° C. for additional 5 min. Cheese was kept at 4° C. and relative humidity of 75%. In the case of the carrageenan, coating was done at 70° C. The cold cheese immediately lowered the temperature of the coating which was later dried in a similar way to the alginate. After 17 days the weight loss of the coated cheese was 3.9% less than the weight loss of the uncoated cheese. Also the color of the coated cheese was better (similar to natural) compared with the uncoated system. In a separate experiment, the same composition for coating was used except for the addition of 0.2% Tween 80 to the sodium alginate or carrageenan solution. It was found that these coatings are smoother and better filled the natural roughness of the cheese surface.

We claim:

1. A food or agricultural product which is a fruit or vegetable, coated by a protective coating comprising a matrix of 40–95% gelled and optionally cross-linked dried hydrocolloid gel;
0.3–12% of at least one of sitosterol and stigmasterol;
4–30% of water; and
optional additives selected from the group consisting of emulsifying agents, preservative agents, adhesive agents, cross-linking or gelation inducing agents, and surface-tension reducing agents.

2. A food product which is cheese, coated by a protective coating comprising a matrix of
20–95% gelled and optionally cross-linked dried hydrocolloid gel;
0.2–50% of at least one natural compound which is a component of milk;
4–30% of water; and
optional additives selected from the group consisting of emulsifying agents, preservative agents, adhesive agents, cross-linking or gelation inducing agents, and surface-tension reducing agents.

* * * * *